(12) United States Patent
Mereu et al.

(10) Patent No.: US 12,164,740 B2
(45) Date of Patent: Dec. 10, 2024

(54) THREE-DIMENSIONAL OPERATIONS BASED ON PLANAR PROJECTIONS IN GRAPHIC USER INTERFACES

(71) Applicant: COREL CORPORATION, Ottawa (CA)

(72) Inventors: Stephen Mereu, Ottawa (CA); Christian Schmaehl, Munich (DE); Konstantin Titov, Ottawa (CA)

(73) Assignee: Corel Corporation, Ottawa (CA)

( * ) Notice: Subject to any disclaimer, the term of this patent is extended or adjusted under 35 U.S.C. 154(b) by 315 days.

(21) Appl. No.: 17/451,942

(22) Filed: Oct. 22, 2021

(65) Prior Publication Data
US 2022/0043555 A1 Feb. 10, 2022

Related U.S. Application Data

(63) Continuation of application No. 15/929,277, filed on Apr. 21, 2020, now Pat. No. 11,199,940.

(51) Int. Cl.
G06F 3/04815 (2022.01)
G06T 7/73 (2017.01)
G06T 15/20 (2011.01)
G06T 19/20 (2011.01)

(52) U.S. Cl.
CPC ............ *G06F 3/04815* (2013.01); *G06T 7/73* (2017.01); *G06T 15/20* (2013.01); *G06T 19/20* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| | | |
|---|---|---|
| 5,371,845 A | 12/1994 | Newell et al. |
| 6,526,166 B1 | 2/2003 | Gorman |
| 2002/0018061 A1 | 2/2002 | Gantt |
| 2002/0118229 A1 | 8/2002 | Batori et al. |
| 2003/0067487 A1 | 4/2003 | Kohls et al. |
| 2011/0074766 A1 | 3/2011 | Page et al. |
| 2013/0227493 A1 | 8/2013 | Schmidt et al. |
| 2020/0310622 A1* | 10/2020 | Faragher ................. G06T 19/20 |
| 2023/0305674 A1* | 9/2023 | Hauenstein ............. G06F 3/011 |
| | | 715/849 |

* cited by examiner

Primary Examiner — Kyle Zhai
(74) Attorney, Agent, or Firm — Rosenberg, Klein & Lee

(57) ABSTRACT

The subject matter of this specification can be implemented in, among other things, a method to display a graphical user interface (GUI) of an application, display, on the GUI, a projection of a three-dimensional object onto a projection plane, receive a selection of a first region of the object, obtain a geometric information related to the first region, wherein the geometric information comprises at least one of a geometric relationship of the first region to a second region of the object or an identification of a shape belonging to the first region, determine, based on the geometric information, a spatial orientation of the first region of the object relative to the projection plane, and display, on the GUI, an indication of the spatial orientation of the first region.

12 Claims, 12 Drawing Sheets

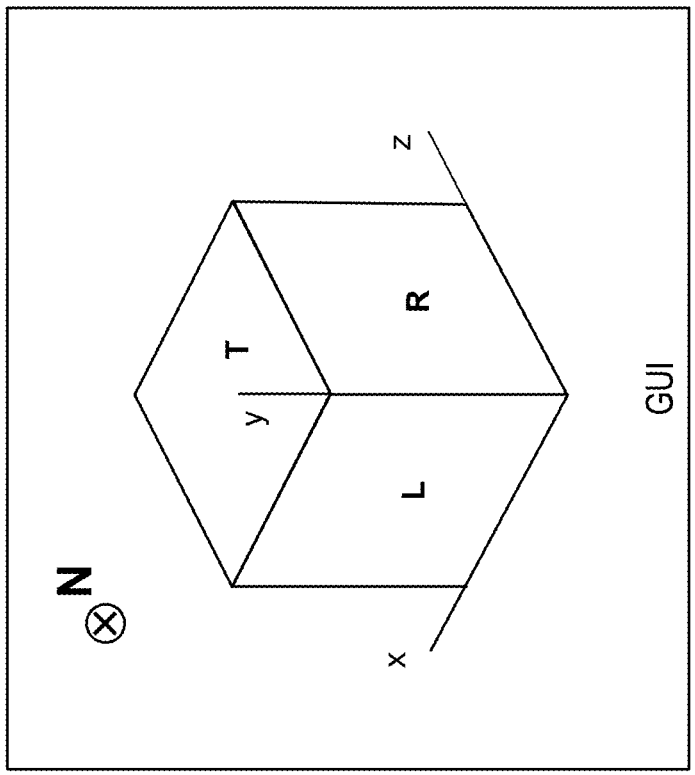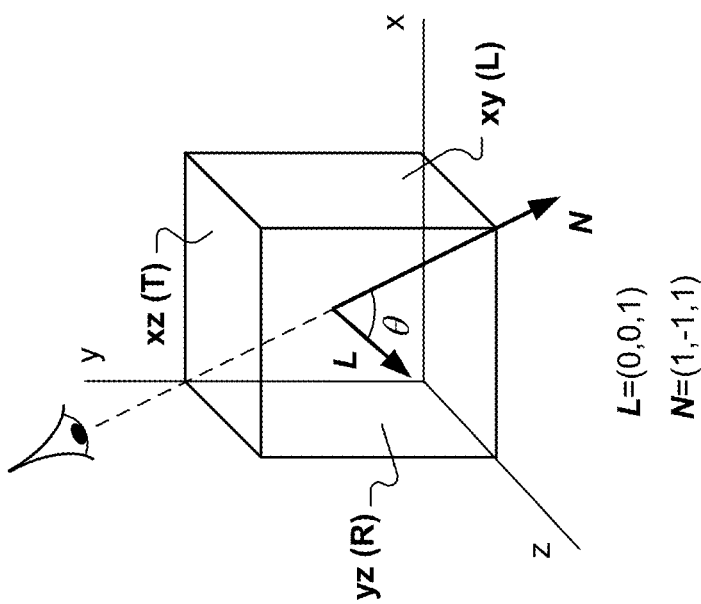
FIG. 1

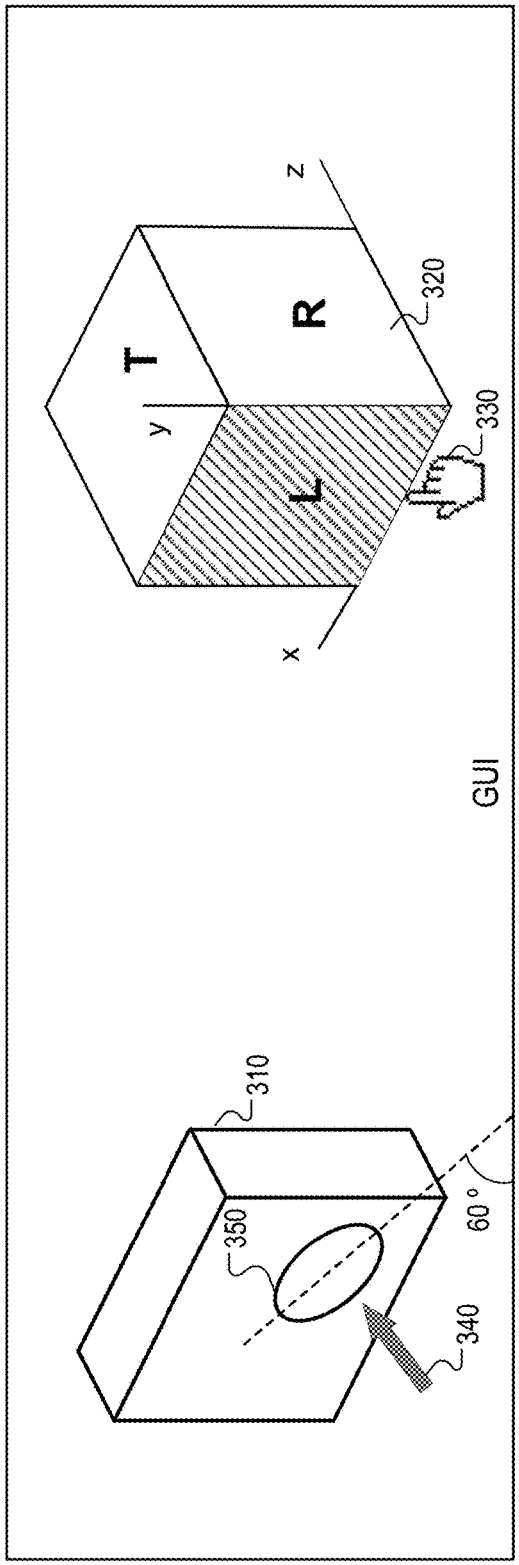
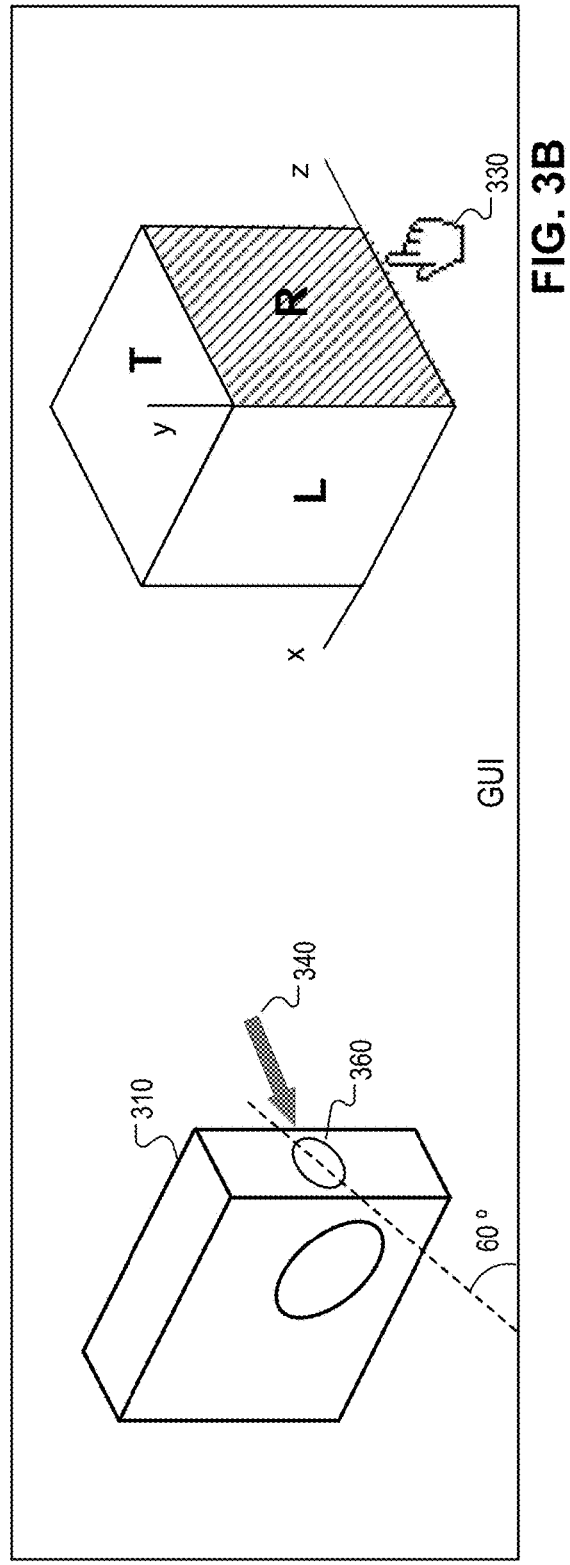

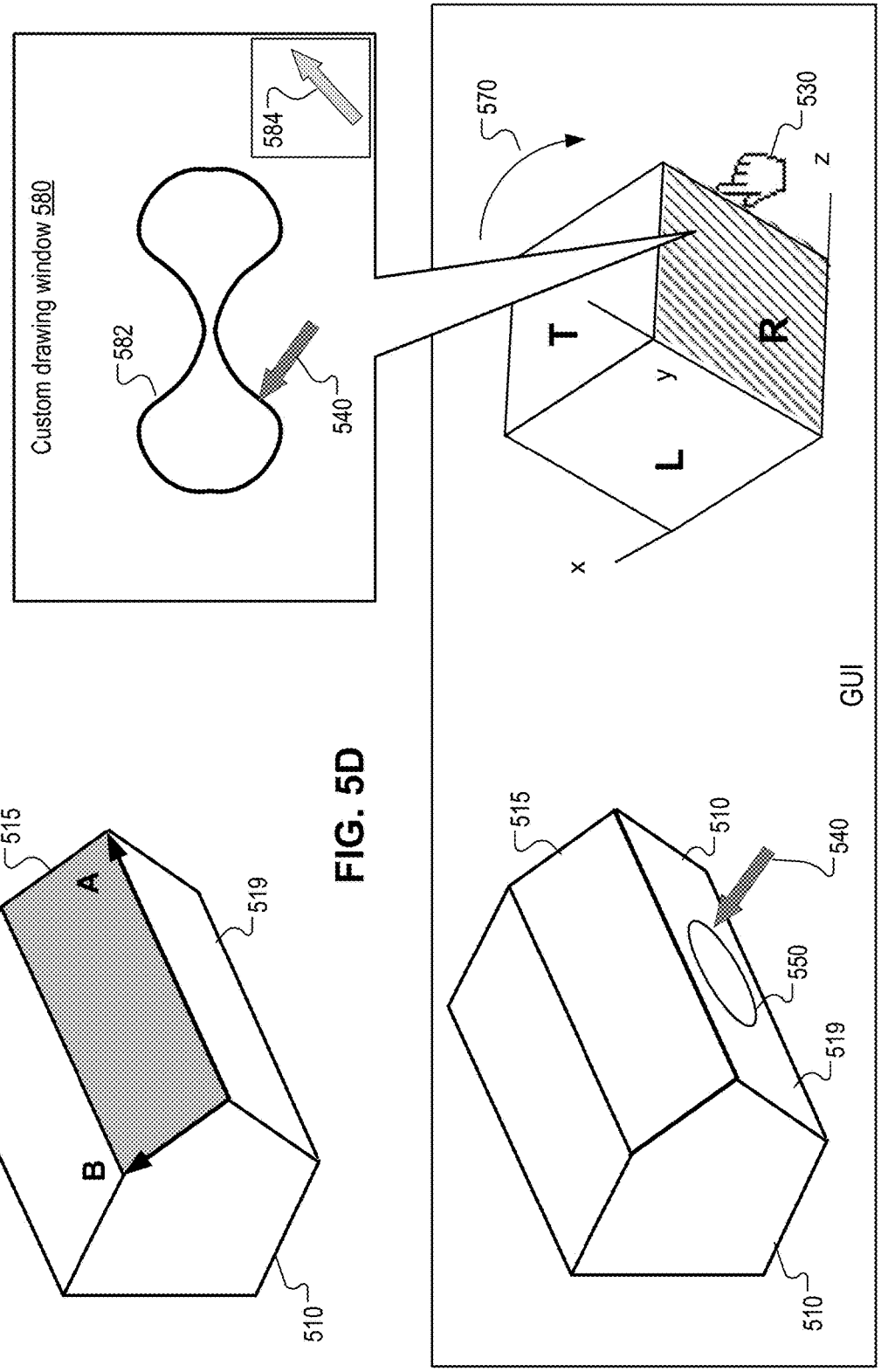

THREE-DIMENSIONAL OPERATIONS BASED ON PLANAR PROJECTIONS IN GRAPHIC USER INTERFACES

CROSS-REFERENCE TO RELATED APPLICATIONS

This application claims the benefit of priority as a continuation patent application of U.S. patent application Ser. No. 15/929,277 filed Apr. 21, 2020; the entire contents of which are incorporated herein by reference.

TECHNICAL FIELD

The instant specification generally relates to viewing and operating on depictions of three-dimensional objects displayed in planar graphic user interfaces. More specifically, the instant specification relates to enabling three-dimensional operations based on planar projections in graphic applications.

BACKGROUND

Digital graphics tools and applications are used for creating and manipulating images. Such tools are used to develop technical drawings, artistic images, audiovisual, sculptural, and other works. In digital graphics tools, images can be represented using raster (bitmap) or vector graphics. Rasterized images utilize fixed-resolution arrays of pixels, whereas vectorized images are defined in terms of various geometric shapes (points, lines, polygons, and so on) and allow scalability without a loss of quality.

In various computer graphics applications, three-dimensional (3D) objects are typically displayed using planar two dimensional (2D) screens. Any type of a projection—parallel, perspective, etc.—used in displaying 3D bodies inevitably suffers from limitations intrinsic to representations of complex objects via a limited set of features. Visualization of surfaces that are parallel to the screen or features that are proximate to the screen is typically much more effective than representation of surfaces or features that make a significant angle with the screen or are located far from it. Available graphics applications may allow rotation of 3D objects for better visualization of the objects and improved efficiency of image development.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 1 illustrates schematically an isometric projection that may be used for displaying 3D objects on a GUI screen, in accordance with some implementations of the present disclosure.

FIGS. 3A-B are an exemplary illustration of a graphical user interface capable of providing drawing functionality within a planar projection of a 3D object, in accordance with some implementation of the present disclosure.

FIGS. 5A-E are another exemplary illustration of a graphical user interface capable of providing drawing functionality within a planar projection of a 3D object where the drawing canvas is not aligned with any of the base planes of the projection, in accordance with some implementation of the present disclosure.

DETAILED DESCRIPTION

Figure 2:
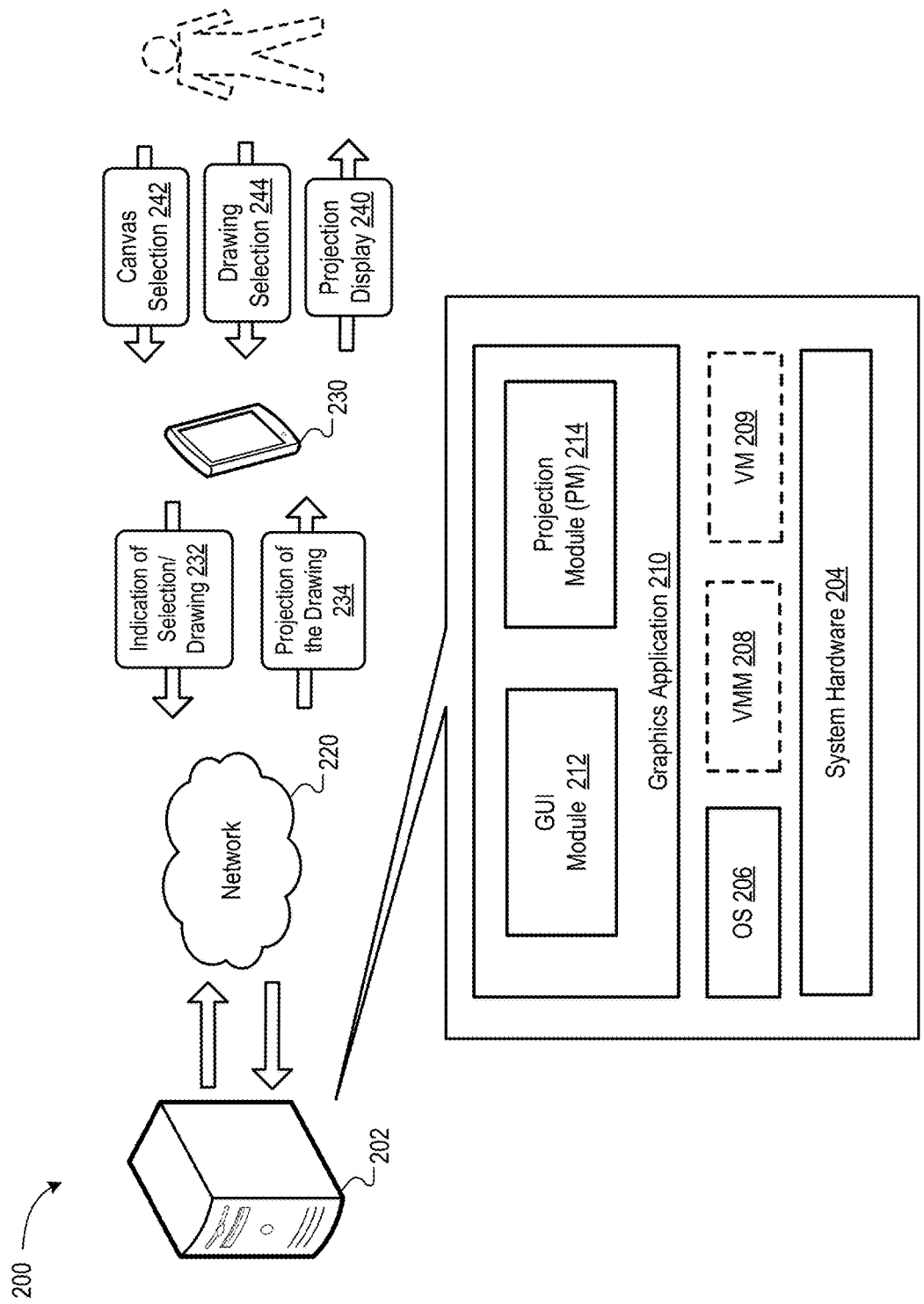
FIG. 2 is a schematic diagram that shows an exemplary computing environment capable of supporting graphics applications to enable three-dimensional graphic operations based on planar projections, in accordance with some implementation of the present disclosure.

Vector-based graphics programs, such as Corel DESIGNER®, CorelDRAW®, and other programs, may support creating precise technical illustrations, e.g., assembly instructions, complex schematics, and highly accurate drawings on various graphical user interfaces (GUIs) capable of user interactivity. Such programs may be compatible with photo-editors and may include dedicated illustration and design tools for axonometric drawing, detailed callouts, advanced dimensioning, as well as other instruments. Having 3D visualization functionality, vector-based graphics programs may allow insertion of 3D models of various objects as linked or embedded images for access, modification, sharing, and/or reference of such bodies. Supported file formats may include computer graphics metafile (CGM), WebCGM, scalable vector graphics (SVG), portable document format (PDF), encapsulated postscript (EPS), and tens of other digital file formats, such as DWG, TIFF, PNG, JPEG, as well as other formats. Vector-based graphics programs may ensure compatibility of various file formats for easy exchange of image data among various users, clients, organizations, and so on.

A developer creating a technical, architectural, artistic, etc., drawing may need to add various parts or details to the object being drawn or modified. Some parts may be added to different sides of the object. For example, an architect may need to add a window to a house façade, a door to the side of the house, and various elements (e.g., rafters, ridges, chimneys) to the roof of the house. In a façade-facing screen projection, adding a window may be straightforward, as the projection of the window may be a simple rectangle. The same window added to a side of the house would appear as a parallelogram (or as a trapezoid, in case of a perspective projection) whose angle(s) may depend on the relative orientation of the GUI screen and the plane containing the side of the house, according to a complicated geometric relationship. A computer graphics application may be equipped with a rotating functionality to align the side of the house with the GUI screen. Such repositioning of the object (e.g., the house), however, has a number of shortcomings. On one hand, rotating the object may require the computer to recalculate representations of numerous other details of the object (a complicated technical drawing may have hundreds of parts and details depicted in the image), which may lead to undesired delays in the image processing. On the other hand, rotating one side of the object towards the GUI screen may obscure other sides and details drawn thereon and thus diminish the illustrative functionality of the image.

It may, therefore, be advantageous to minimize instances of spatial rotations of the object and expose as many sides of the object as possible (e.g., three) to the GUI screen while being able to draw and/or add elements directly on/to the exposed sides. FIG. 1 illustrates schematically an isometric projection that may be used for displaying 3D objects on a GUI screen, in accordance with some implementations of the present disclosure. As depicted in the left part of FIG. 1, the isometric projection exposes three sides of a cube (labelled with letters "L" (left), "T" (top), and "R" (right), respectively) in an equal fashion so that the three adjacent ribs of the cube (along the x, y, and z axes, as shown) make 120° angles with each other. As depicted in the right part of FIG. 1, the isometric projection produces an image of an object, displayed on the GUI screen, as obtained when viewing the object (a cube is shown) along the direction described by the unit vector $$N = \frac{1}{\sqrt{3}}(1, -1, 1).$$

The isometric projection view disregards perspective distortion and represent intervals near a far point R1=(1,1,1) in the same way as it represents intervals near a close point R2=(0,1,0), i.e., differently than perceived by a human eye. Nonetheless, because of the uniformity of such mapping, drawing on or adding elements to objects displayed in the isometric projection may be particularly advantageous. For example, a circle (e.g., a hole to accept a bolt) added to a surface that is parallel to any of the base planes of the isometric projection (planes xy, yz, and xz) would appear as an ellipse with the ratio of the major semi-axis to the minor semi-axis of √3:1. Other geometric elements (squares, polygons, trapezoids, etc.) may similarly be added to any of the surfaces that are parallel to any base plane of the isometric projection.

However, complex images and drawings may have a geometry that is different from the geometry of a cube (or a parallelepiped) and may include planes, surfaces, and elements that are not parallel to any of the base planes. Adding drawings to such planes in a computationally efficient manner may present significant technical challenges. Even in the simplest example of a circle to be drawn on an arbitrarily oriented surface ("canvas surface" or "canvas plane"), a number of difficulties may arise. For example, even though in a parallel non-perspective projection any circle must appear as an ellipse, both the ratio of the ellipse's semi-axes and the orientation of the ellipse (e.g., the direction of its major axis) may depend on the orientation of the canvas plane relative to the plane of the GUI screen.

Aspects and implementations of the present disclosure address these and other shortcomings of the existing technology by enabling addition of elements and drawings to GUI screen projections based on a minimum geometric information about the canvas surfaces. The geometric information may include data that is sufficient to determine the orientation of the canvas surface relative to the GUI screen. In one example, it may be known that the canvas surface already includes a known geometric shape. For example, the known shape may be a square (even though any other known geometric shape may be used instead), which may appear on the GUI screen as a parallelogram. From the angle at a vertex of the parallelogram and the lengths of the projections that the sides of the parallelogram make on the GUI screen, the orientation of the canvas surface (that includes the square) may be determined. Having determined the canvas surface in this manner, the graphics program may receive an input from a user of the program, e.g., an identification of a new object to be drawn on the canvas surface, and determine how this new object is to appear on the GUI screen if the new object were added to the canvas surface.

In another implementation, no previously drawn shapes may be located on the canvas surface/plane selected by the user, and the boundary of the canvas surface as displayed on the GUI screen may be a generic geometric figure (e.g., a rectangle of unknown dimensions belonging to the 3D object). Such a figure may be a cross section of a part of the 3D object by the canvas plane. In such instances, the geometric information may include a relative orientation of the canvas surface/plane relative to some other reference plane. For example, the reference plane may be one of the base planes of the isometric projection. In some instances it may be known that the base plane is perpendicular the canvas surface (or makes any other known angle with the canvas surface). From this information and a visual appearance of an unknown rectangle (or some other shape) on the GUI plane, the graphics application may determine the orientation of the canvas surface. The graphics application may then be able to draw on or relative to the canvas plane (e.g., display a hole to be drilled, a bolt to be inserted, and so on) responsive to receiving further user inputs/requests.

In yet another implementation, a canvas plane may be oriented in some arbitrary fashion with respect to any of the base planes (or other known planes of the 3D object). For example, the plane may be input by the user by selecting, within the GUI screen, three points that belong to the canvas plane. In such instances, the geometric information may include, for example, three distances that the canvas plane cuts off of three known axes (e.g., axes x, y, and z), or three angles that the selected plane makes with the base plane, and the like. From this geometric information, the graphics application may determine the orientation of the canvas surface. As describe above, the application may then be able to draw on or otherwise operate relative to the canvas plane.

FIG. 2 is a schematic diagram that shows an exemplary computing environment 200 capable of supporting graphics applications to enable three-dimensional graphic operations based on planar projections, in accordance with some implementation of the present disclosure. The environment 200 includes a computing system (e.g., a server) 202 in communication (optionally, over a network 220) with a GUI 230. The network 220 may be a local area network (LAN), a wide area network (WAN), and/or one or more of the computing devices that make up the Internet. In some implementations, The GUI 230 may be a part of the computing system 202. For example, the GUI 230 may be provided on a local, to the computing system 202, monitor. In some implementations, the GUI 230 is provided on a screen of a "thin" client having minimal computing capabilities, configured to display the GUI 230 to a user and receive the user's inputs and instructions to be executed on a remote server (e.g., computing system 202).

The computing system 202 may execute a graphics application (e.g., application 210) and provide it to the user. The graphics application may be a vector-based or a raster-based application. The graphics application may display (240) a planar projection of a 3D object on the GUI screen to the user. In some implementations, the planar projection may be a parallel projection, e.g., an isometric projection. In some implementations, the planar projection may be a perspective projection, or some other projection of the 3D object on the GUI screen. The projection provided to the user may have base planes, such as the planes xy, yz, xz, of the isometric projection. The user may select (242) a plane—referred to as canvas plane herein—to add drawings to the canvas plane. The canvas plane may be different from the base planes of the planar projection. The indication of the user selection may be transmitted (232), over internal bus or the network 220, to the computing system 202 for processing therein. The canvas selection may include geometric information as described above and disclosed in more detail below. The computing system 202 may determine, based on the selected canvas plane and the geometric information, the orientation of the canvas plane relative to the GUI screen and/or the base planes of the planar projection. In some implementations, the canvas plane may be displayed to the user of the GUI 230. For example, the GUI 230 may include a reference cube (parallelepiped) that may be rotated until one of the sides of the reference cube aligns with the canvas plane. The user may then select a drawing to be added to the canvas plane (244). For example, the user may add a circle, an ellipse, a square, a polygon, or any pre-defined shape (e.g., a right-angle isosceles triangle, a trapezoid with specific sides, and the like). The selection of the drawing may be transmitted (232) to the computing system 202, which may compute how the selected drawing is to appear on the planar projection displayed on the GUI screen to the user. The computed projection of the drawing may then be transmitted (234) to the GUI 230 for displaying to the user.

In some implementations, the canvas screen initially selected (242) by the user may be different from the canvas screen to which the selected drawing (244) is to be added. For example, the user may initially select a primary canvas plane, but add a drawing to a secondary canvas plane. The secondary canvas plane may have a known geometric relationship to the primary canvas plane. For example, the secondary canvas plane may be perpendicular to the primary canvas plane. Based on the selection of the secondary canvas plane and the user-selected drawing to be added (244) to the secondary canvas plane, the computing system 202 may compute how the selected drawing, when added to the secondary canvas plane, is to appear on the planar projection displayed on the GUI screen to the user. The computed projection of the drawing may then be transmitted (234) to the GUI 230 for displaying to the user as an added part of the 3D image.

As depicted in FIG. 1, the computing system 202 may include a system hardware 204 to support execution of the graphics application 210 and operations described in the instant disclosure. The system hardware 204 may include one or more central processing units (CPU), also referred to as "processing devices" herein, communicatively coupled to one or more memory devices and one or more peripheral devices via a system bus. The system hardware 204 may also include output devices, such as speakers, video projectors, video monitors, and the like, and input devices, such as microphones, video cameras, and the like. The system hardware 204 may be operated by an operating system (OS) 206. The graphics application 210 may be instantiated by the OS 206. In some implementations, the graphics application 210 may be implemented as part of a virtual execution environment, as indicated by the (optional) elements of FIG. 2, depicted with dashed rectangles. In certain implementations, the virtual execution environment may be implemented using certain hardware-assisted virtualization features of the computing system 202, which may support executing, a hypervisor/virtual machine monitor (VMM) 208 that manages one or more virtual machines (VM) 209. In various implementations, the VMM 208 may be implemented as a kernel module, a kernel extension, a driver, or a part of the OS 206. In implementations that involve virtualization, the graphics application 210 may be executed as part of the VM 209. In some implementations, the virtual machine environment may use Parallels® Remote Desktop Services (RDS) based on the Remote Desktop Session Host (RDSH) technology, or the Parallels® Virtual Desktop Infrastructure (VDI), or some other similar technology.

"Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor, which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. A processing device may also be referred to as a CPU. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices. Certain peripheral devices, such as flash memory cards, compact disks, HDDs, or SSDs, may be hot-pluggable into the computing system 202. Insertion of such a peripheral device into a suitable interface (e.g., a Universal Serial Bus (USB) socket) of the computing system 202 may trigger mounting the peripheral device by the OS 206. Mounting the peripheral device may involve identifying the device type, installing and/or activating an appropriate device driver, and initializing the peripheral device by the OS 206 via the device driver.

The graphics application 210 may include a GUI module 212 to generate instructions for the GUI 230 to display 3D objects thereon. The graphics application 210 may further include a projection module (PM) 214 for performing computations to determine spatial orientation of various canvas surfaces selected by a user and for displaying on the selected canvas surfaces various drawings specified by the user, in accordance with the techniques described below.

FIGS. 3A-B are an exemplary illustration of a graphical user interface capable of providing drawing functionality within a planar projection of a 3D object, in accordance with some implementation of the present disclosure. Depicted in FIGS. 3A-B are isometric projections of a 3D object, but in various other implementations contemplated in the present disclosure, different types of planar projections may be used instead. FIG. 3A illustrates how a planar projection operates, in one exemplary non-limiting implementation. Depicted schematically in FIG. 3A is a GUI (e.g., GUI 230). The GUI displays (on the left) a planar projection of a 3D object 310 having three planar regions that are parallel to the base planes of the projection used in depiction of the object 310. Also shown (on the right) is a reference cube 320 than may be displayed for the sake of the user's convenience and further to provide to the user a selective functionality to facilitate adding drawings and other elements to various regions of the object 310.

As illustrated in FIG. 3A, the user may select a specific plane (side) of the reference cube using an input device 330, such as a mouse, a keyboard, and the like. For example, as shown, the user may select an L base plane (the "Left" plane, or the xy plane). Responsive to the user's selection, the L base plane may be highlighted (e.g., by changing its color, shading, or by any other means). The user may select a drawing tool 340 and draw on the region of the object 310 that is parallel to the selected L base plane. For example, if the drawing tool 340 is a circle-drawing tool, the PM 214 may determine the shape of the resulting ellipse 350 that is to be drawn on the object 310. For example, in case of an isometric projection, the ellipse may have the ratio of its major semi-axis to its minor semi-axis $\sqrt{3}:1$. Furthermore, the PM 214 may determine that the angle that the major semi-axis of the ellipse is 60° with the baseline of the GUI. Although in this example the drawing tool 340 is a circle-making tool, in other instances any other graphics tool may be used instead. For example, if the user selects any known shape—e.g., a polygon, a zigzag line, an ellipse, an isosceles triangle, or any predefined shape (e.g., a ring, an arrow, or any shape that can be found in the graphics application)—the PM 214 may compute how the selected shape is to appear on the GUI screen. For example, the PM 214 may retrieve the information about the L base plane, such as the unit vector normal to the L base plane: $L=(0,0,1)$, as depicted in FIG. 1. From the relative orientation of vector L and vector N, the PM 214 can determine how the selected shape, which has a known shape if drawn within the L base plane, is to appear on the projection corresponding to the GUI screen (which is perpendicular to the view vector N). Specifically, cosine of the angle $\theta$ that the vectors L and N make is to be given by the dot vector product, $\cos \theta = L \cdot N = 1/\sqrt{3}$. Similarly, the direction of the line along which the two planes intersect is determined by the cross product of the respective vectors, $L \times N$.

FIG. 3B further illustrates the drawing functionality within the planar projection of a 3D object. The user may select a different base plane of the reference cube 320, e.g., the R ("right") base plane and use the drawing tool 340 to draw a new selected shape on the side of the object 310 parallel to the R base plane. For example, the user may select a circle-drawing tool 340 and draw a circle that would appear as an ellipse that makes the angle 60° with the baseline of the GUI (this time with the right-facing direction of the baseline). Similarly, any other drawing tool may be used to draw any other known shape on the side of the object 310 parallel to the R base plane.

In some implementations, the user may need to draw a custom object rather than a predetermined shape. In such instances, the user may select a "custom drawing" button (or any equivalent thereof). Responsive to such selection, the GUI module 212 may provide a custom drawing window (or any equivalent) to the user. The user may draw within this custom drawing window as if the user were facing the side of the object 310 onto which the custom shape is to be added. When the shape is complete (or, in some implementations, while the shape is still being drawn), the PM 214 may receive the coordinates of various elements of the custom shape and compute the respective coordinates for displaying these elements on the GUI screen.

Figure 4C:
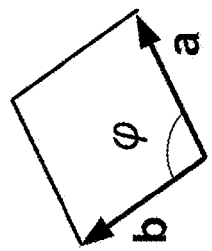
FIGS. 4A-D are an exemplary illustration of a graphical user interface capable of providing drawing functionality within a planar projection of a 3D object where the drawing canvas is not aligned with any of the base planes of the projection, in accordance with some implementation of the present disclosure.
Figure 4B:
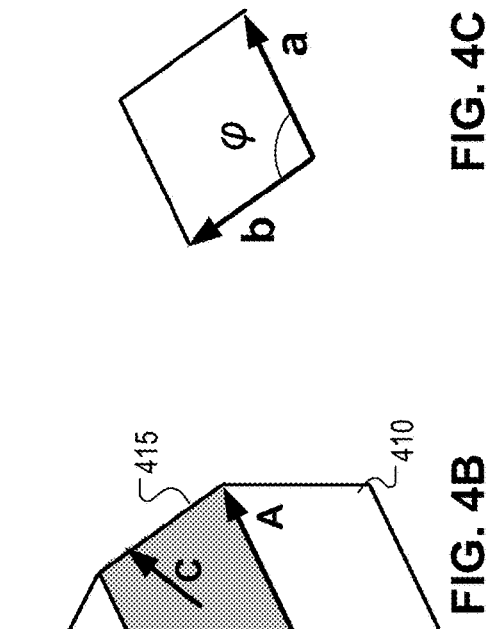
Figure 4A:
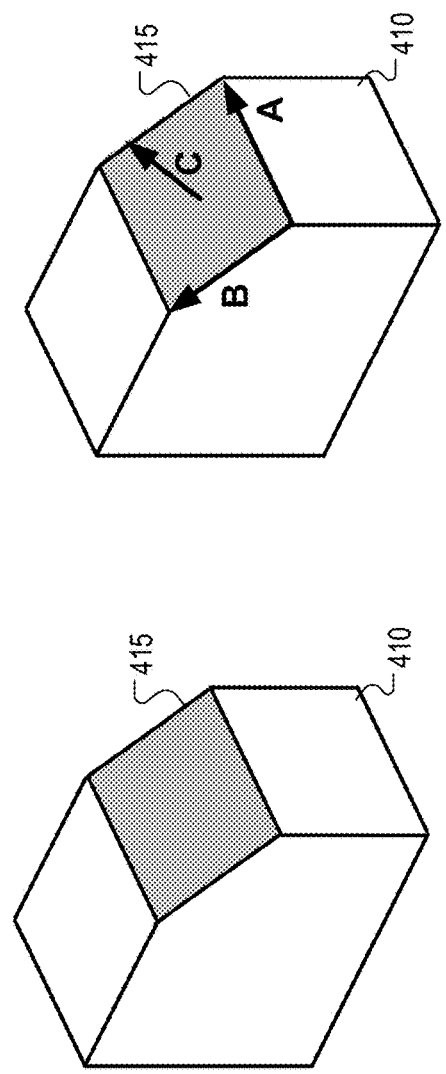

In some implementations, however, the user may need to draw on canvases (surfaces or regions of the object) that are not aligned with any of the base planes of the projection (e.g., different from any of the L, T, or R planes of the isometric projection). In such implementations, the PM 214 may first need to determine the orientation of the selected canvas prior to adding drawings to it. FIGS. 4A-D are an exemplary illustration of a graphical user interface capable of providing drawing functionality within a planar projection of a 3D object where the drawing canvas is not aligned with any of the base planes of the projection, in accordance with some implementation of the present disclosure. Shown in FIG. 4A is an object 410 having a shaded region 415 which is not parallel to any of the base planes of the planar projection being used to display the object 410. The user may first select (using any suitable pointing device) the shaded region as a region of interest. The region may contain any known geometric shape therein. For example, it may be known that the region is bound by a square or any other one-parameter geometric shape. Herein, the term "m-parameter shape" is used to indicate a geometric figure that requires m parameters to specify its shape (but not its orientation). For example, a circle may require that only its radius be specified. Hence, a circle is a one-parameter shape. Similarly, a square (or any regular polygon) may be defined by specifying a length of its side. Likewise, a right-angle isosceles triangle is uniquely defined by any of its sides (e.g., by a length of its hypotenuse). Although FIGS. 4A-D depict, for brevity and conciseness, performance of a drawing operation on the region 415 that has the shape of a square, any other one-parameter shape can used in a similar fashion.

If it is known that a one-parameter shape is present within the selected region (e.g., the shape represents the boundary of the selected region 415), the orientation of the plane containing the selected region can be fully determined. As depicted in FIG. 4B, the selected region 415 may be defined by three-dimensional (three-component) vectors A and B. However, what is accessible to the PM 214, may be a set of two-dimension (two-component) vectors a and b within the plane of GUI screen, as depicted in FIG. 4C. The 2D vectors a and b are projections of the 3D vectors A and B onto the GUI screen (which is perpendicular to the viewing vector N). The 2D vectors a and b may be specified in any way that uniquely determine them. For example, each or some of the 2D vectors a and b may be specified by their horizontal and vertical components relative to the GUI screen. In some implementations, each or some of the 2D vectors a and b may be specified by their absolute values (lengths) and the angles they make with the horizontal (or vertical) direction of the GUI screen.

In conjunction with the knowledge that the selected region 415 is a one-parameter shape, the 2D vectors a and b may uniquely determine the 3D vectors A and B. Determining the 3D vectors may be performed as follows. The 3D vectors are combinations, $$A=a+\alpha N, B=b+\beta N,$$

with yet unknown coefficients $\alpha$ and $\beta$. These coefficients can be obtained by noticing that, on one hand, in a square, the two sides are orthogonal to each other, so that $A \cdot B = 0$, which gives $$\alpha\beta = -a \cdot b = -ab \cos \varphi,$$

and, on the other hand the two sides have the same length, so that $A^2 = B^2$, which further gives $$\alpha^2 - \beta^2 = b^2 - a^2.$$

The two equations for a and can be solved to determine the 3D vectors A and B. Determining the coefficients $\alpha$ and $\beta$ thus amounts to solving quadratic equations. Specifically, $$\alpha^2 = \tfrac{1}{2}(b^2 - a^2 + \sqrt{a^4 + b^4 + 2a^2 b^2 \cos 2\varphi}),$$

$$\beta^2 = \tfrac{1}{2}(a^2 - b^2 + \sqrt{a^4 + b^4 + 2a^2 b^2 \cos 2\varphi}).$$

Figure 4D:
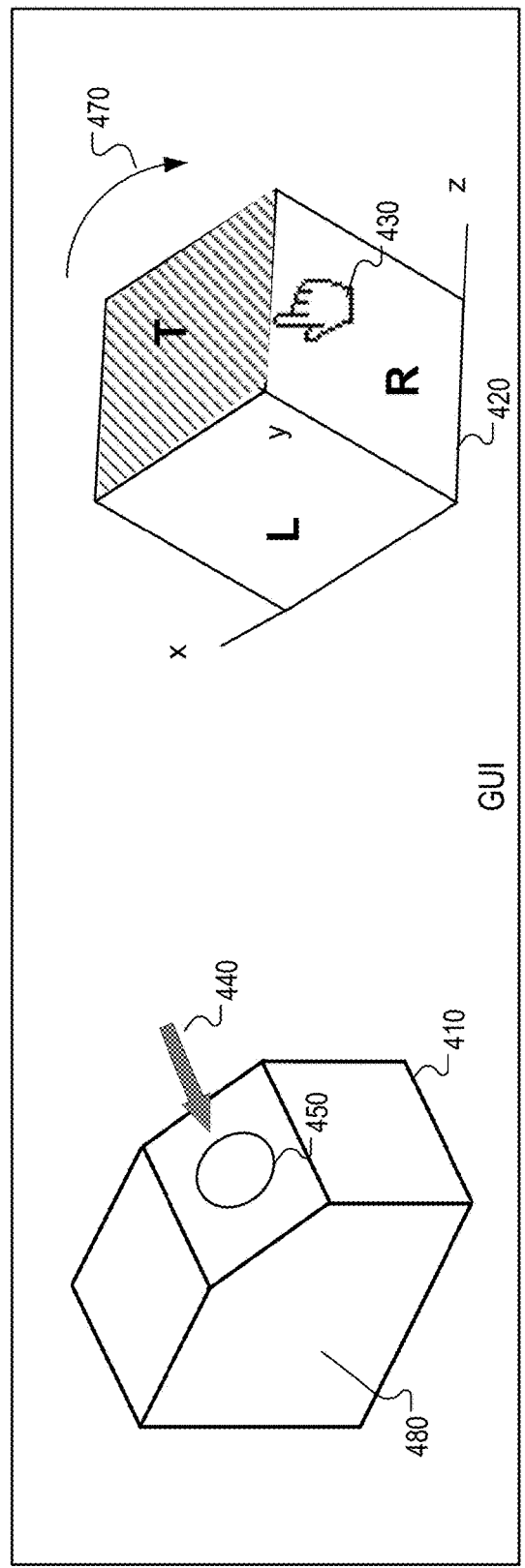

Once the PM 214 has determined the 3D vectors A and B, the PM 214 can determine the orientation of the selected region 415 by computing the cross product $C = A \times B$, as depicted in FIG. 4B. Once the direction C normal (perpendicular) to the selected region 415 is determined, any drawings selected by the user to be added to the selected region may be implemented in a way similar to how drawings may be added to a base plane, as described above in relation to FIGS. 3A-B. For example, as depicted schematically in FIG. 4D, in some implementations, the reference cube 420 may be rotated (470) to help the user to visualize the selected region 415. As shown, the top side (T) of the reference cube 420 may be aligned parallel to the selected region 415. The user may select a canvas surface by pointing (430) to a desired side of the reference cube 420 (optionally, the selected side may be highlighted—e.g., shaded in FIG. 4D). The user may select a drawing tool 440, and add a drawing 450 (a circle projected as ellipse is shown for concreteness) to the selected canvas plane. As depicted in FIG. 4D, the drawing is added to the primary canvas (directly to the selected region 415). In some implementations, however, a drawing may instead (or in addition to) be added to a different, secondary, canvas. For example, after the reference cube 420 is rotated to a position depicted in FIG. 4D, the user may point to the L base plane of the rotated reference cube 420, and add a drawing to the corresponding side 480 of the object 410.

Figure 5A:
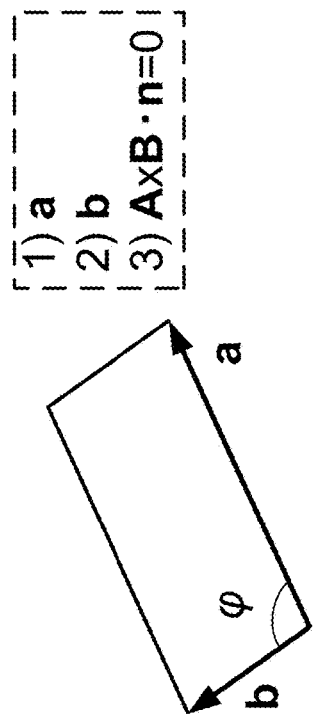

FIGS. 5A-E are another exemplary illustration of a graphical user interface capable of providing drawing functionality within a planar projection of a 3D object where the drawing canvas is not aligned with any of the base planes of the projection, in accordance with some implementation of the present disclosure. Shown in FIG. 5A is an object 510 having a selected shaded region 515 that is not parallel to any of the base planes of the planar projection and is a two-parameter geometric shape, such as a rectangle, an isosceles triangle, a rhombus, an ellipse, and the like.

Although FIGS. 5A-E depict, for brevity and conciseness, performance of a drawing operation on the region 515 that has the shape of a rectangle, any other two-parameter shape can be used (e.g., drawn upon) in a similar fashion.

Figure 5B:
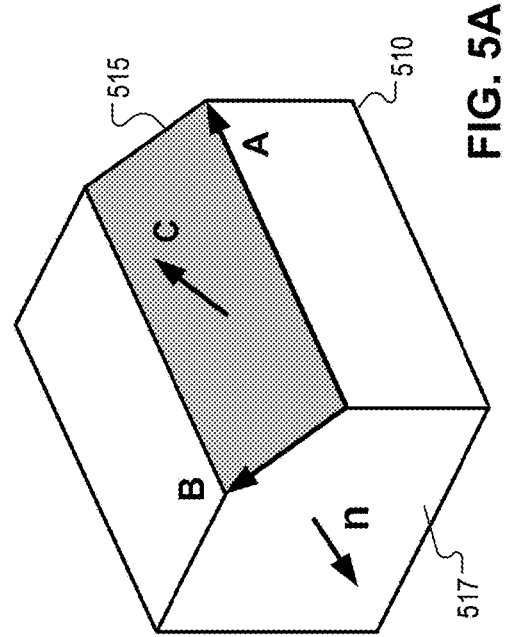
Figure 5C:
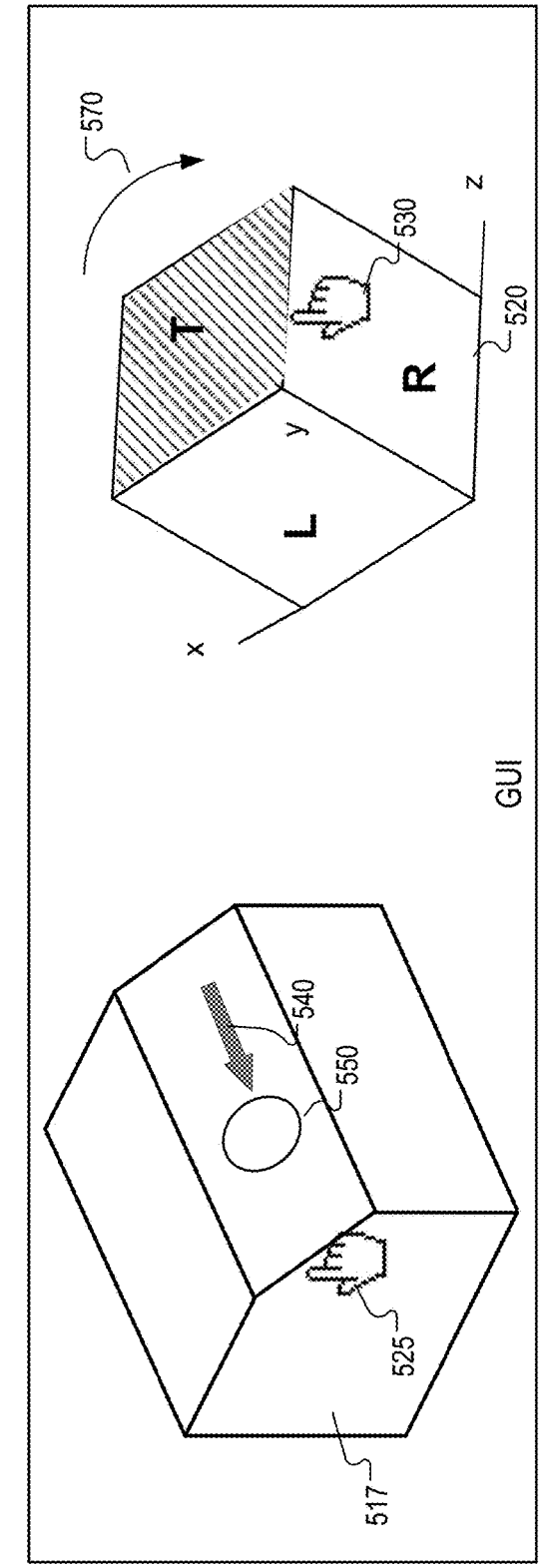

To fully determine the 3D orientation of the selected region 515, a 2D shape present within the selected region (e.g., the shape representing the boundary of the selected region 515) may have to be supplemented with an additional geometric data. Such additional data may include a relative orientation of the selected region with respect to some other known geometric feature of the object 510. For example, it may be known that the plane containing the selected region is perpendicular to a given plane, e.g., to the plane containing region 517 whose normal direction n is known. The plane containing region 517 may be parallel to one of the base planes of the planar projection. Alternatively, the orientation of the plane containing region 517 may have been determined during one of the previous selections by the user. As shown in FIG. 5C, the user may point (525) to an edge of the selected region 515 where the selected region intersects with a plane (e.g., plane containing region 517) that is perpendicular to the selected region 515.

As depicted in FIG. 5A, the selected region 515 may be defined by 3D vectors A and B. To determine these 3D vectors, the PM 214 may first access the 2D vector projections a and b of vectors A and B onto the plane of the GUI screen, as depicted in FIG. 5B. In conjunction with the knowledge that the selected region 515 is a two-parameter shape, the 2D vectors a and b, and the information that the direction C normal to the selected region 515 is also perpendicular to the direction n, the 3D vectors A and B can be uniquely determined. As before, the 3D vectors may be represented as $$A=a+\alpha N, B=b+\beta N.$$

The coefficients $\alpha$ and $\beta$ can be obtained by noticing that, on one hand, in a rectangle, the two sides are orthogonal to each other, so that $A \cdot B = 0$, which gives $$\alpha\beta = -a \cdot b = -ab \cos \varphi,$$

and, on the other hand, that the orthogonality condition $A \cdot B \cdot n = 0$ provides that $$\beta(N \times a) \cdot n - \alpha(N = b) \cdot n = (a \times b) \cdot n$$

Determining the coefficients $\alpha$ and $\beta$ again amounts to solving quadratic equations. Once the PM 214 has determined the 3D vectors A and B, the PM 214 can determine the orientation of the selected region 515 by computing the cross product $C = A \times B$, as depicted in FIG. 5A. Once the direction C normal (perpendicular) to the selected region 515 is determined, any drawings selected by the user to be added to the selected region may be implemented as if the drawings were to be added to a base plane. As depicted schematically in FIG. 5C, in some implementations, the reference cube 520 may be rotated (570) to help the user with to visualize the selected region 515. As shown, the top side (T) of the reference cube 520 may be aligned parallel to the selected region 515. The user may select a canvas surface by pointing (530) to a desired plane of the reference cube 520 (optionally, the selected side may be highlighted—e.g., shaded in FIG. 5C), select a drawing tool 540, and add a drawing 550 (a circle projected as ellipse is shown for concreteness) to the selected canvas. As depicted in FIG. 5C, the drawing is added to the primary canvas, i.e. directly to the selected region 515. In some implementations, however, a drawing may instead (or in addition to) be added to a different, secondary, canvas. For example, after the reference cube 520 is rotated to a position depicted in FIG. 5C, the user may point to the L base plane of the reference cube 520, and add a drawing to the corresponding region 517 of the object 510.

FIGS. 5D-E further illustrate how a drawing may be added to a secondary canvas. In the example shown in FIG. 5D, the object 510 may have region 515 that is perpendicular to region 519 but none of the regions 515 or 519 are aligned with any of the base planes of the isometric projection. After a selection of the region 515 is made by the user, and the PM 214 has determined the orientation of the selected region and displayed the reference cube 530 with the top side T aligned with the selected region 516, the user may select (530) the right side R of the cube 530 as the secondary canvas. As a result, the PM 214 may recognize that the subsequent drawings are to be displayed as drawn on the secondary canvas. Specifically, the user may select the drawing tool 540, and add a drawing 550 (e.g., circle, an ellipse, or any other shape) to the selected secondary canvas containing region 519, as depicted in FIG. 5E. While the reference cube 530 is in the position shown in FIG. 5E, the user may select a different side of the cube, e.g., the primary canvas (parallel to the T base plane of the rotate cube) and add further drawings/elements to the region 515. In some implementations, a custom drawing window 580 may be presented to the user (e.g., responsive to a request from the user for such a window). The user may draw a custom shape 582 using any available drawing tool(s) 540 within this custom drawing window 580 as if the user were facing the region 519 onto which the custom shape is to be added. In some implementations, the custom drawing window 580 may include a pointer 584 to indicate how the custom shape 582 is to be positioned within the canvas (e.g., the secondary canvas corresponding to the region 519 or the primary canvas corresponding to the region 515).

Figure 6B:
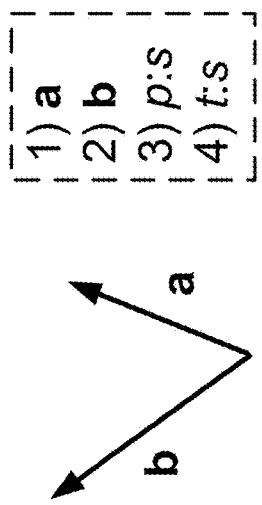
FIGS. 6A-C are another exemplary illustration of the graphical user interface capable of providing drawing functionality within a planar projection of a 3D object where the drawing canvas is not aligned with any of the base planes of the projection, in accordance with some implementation of the present disclosure.
Figure 6A:
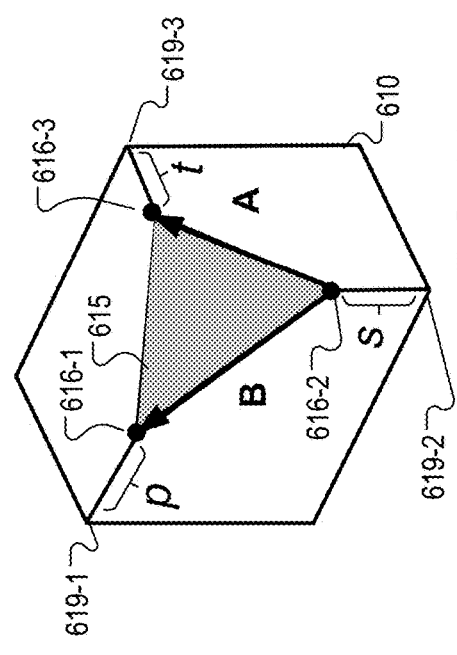
Figure 6C:
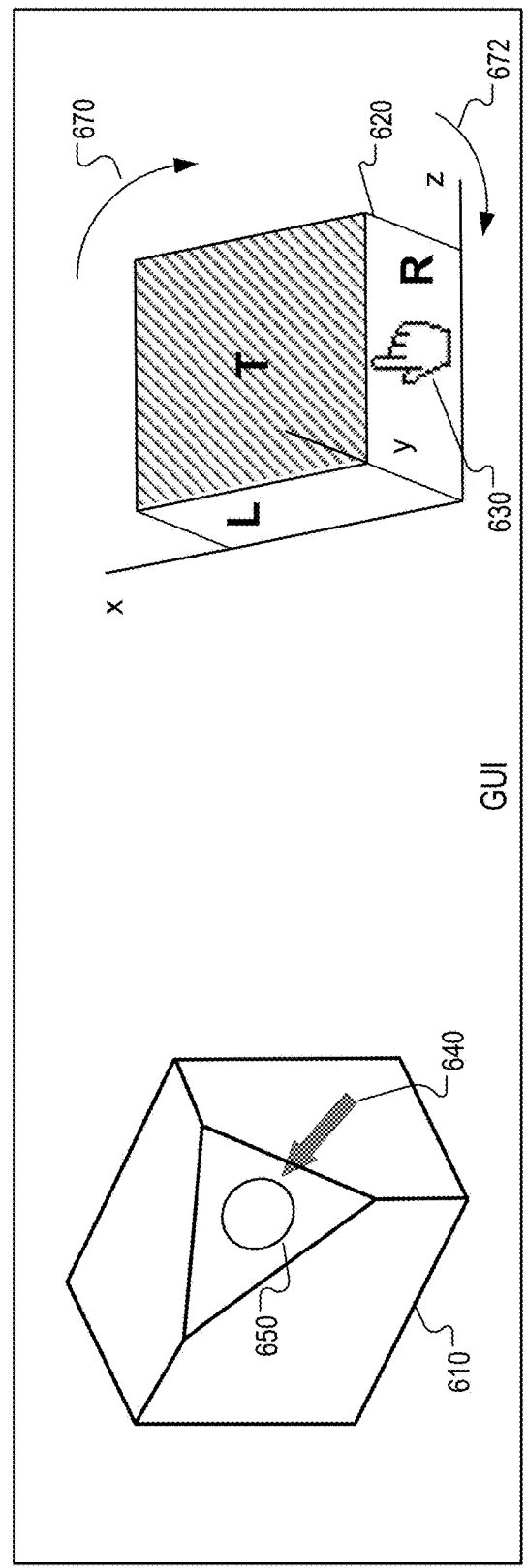

FIGS. 6A-C are another exemplary illustration of the graphical user interface capable of providing drawing functionality within a planar projection of a 3D object where the drawing canvas is not aligned with any of the base planes of the projection, in accordance with some implementation of the present disclosure. Shown in FIG. 6A is an object 610 having a selected shaded region 615 which is not parallel to any of the base planes of the planar projection and is a three-parameter geometric shape, such as an arbitrary triangle (defined by, e.g., lengths of its three sides), a parallelogram (defined by, e.g., lengths of its two adjacent sides and an angle there between), and the like. Although FIGS. 6A-C depict, for brevity and conciseness, performance of a drawing operation on the region 515 that has the shape of a triangle, any other two-parameter shape can be drawn upon in a similar fashion.

To specify the selected region 615, in one implementation, the user may specify a plane (canvas plane) that contains the selected region 615 by, e.g., identifying three points that belong to the plane, such as points 616-1, 616-2, and 616-3, in one non-limiting example. The PM 214 may determine the 2D distance from points 616 to a set of reference points 619. The distances may be counted along (or in parallel) to the axes (e.g., axes x, y, z) of the projection space, in some implementations. For example, the 2D distance along the projection of the x-axis from the selected point 616-1 to the reference point 619-1 may be p, the 2D distance along the projection of the y-axis from the selected point 616-2 to the reference point 619-2 may be s, and the 2D distance along the projection of the z-axis from the selected point 616-3 to the reference point 619-3 may be t. Based on the available geometric data, e.g., the 2D projected vectors a and b and the two ratios p:s and t:s (or any other ratios, such as p:t and t:s), as depicted schematically in FIG. 6B, the PM 214 may determine the values of the coefficients α and β in the decomposition of the vectors A and B $$A=a+\alpha N, B=b+\beta N.$$

Having determined the 3D vectors A and B, the PM 214 can determine the orientation of the selected region 615 by computing the cross product C=A×B, as described in above relation to FIGS. 4B and 5A. Once the direction C normal (perpendicular) to the selected region 615 is determined, any drawings selected by the user to be added to the selected region may be displayed. As depicted schematically in FIG. 6C, in some implementations, the reference cube 620 may be rotated to help the user with a visualization of the selected region 615. As shown, two rotations may be needed to align the top surface (T) of the reference cube 620 to be parallel to the selected region 615, such as a first rotation 670 around the z-axis and a second rotations 672 around the new direction of they-axis. The user may select a canvas surface by pointing (530) to a desired plane of the reference cube 520 (optionally, the selected side may be highlighted—e.g., shaded in FIG. 5C), select a drawing tool 640, and add a drawing 650 to the selected canvas. As depicted in FIG. 6C, the drawing is added to the primary canvas, i.e. directly to the selected region 615. In some implementations, however, a drawing may instead (or in addition to) be added to a different, secondary, canvas, as described above.

Once the PM 214 has computed the 3D orientation of a region of the object, the PM 214 may store (e.g., in a memory accessible to the graphics application 210) the determined orientation for future uses. For example, if the user subsequently selects a region that has been selected previously, the PM 214 may not need to re-compute the region's orientation and may simply retrieve its orientation from the memory.

In some implementations, any or all of the drawing tools 340, 440, 540, and 640 may include transient guides to help the user visualize (to facilitate correct positioning and sizing) the end result during creation of standard of custom drawings. For example, if the user draws a circle (displayed as ellipse 340) or a custom shape 582, the circle or the custom shape may be transiently displayed to the user. These transient displays may be modified in real time as the user makes changes (e.g., resizes or repositions the shape). When the user completes the drawing process, the transient guides may disappear or merge into the end result (a final drawing).

Figure 7:
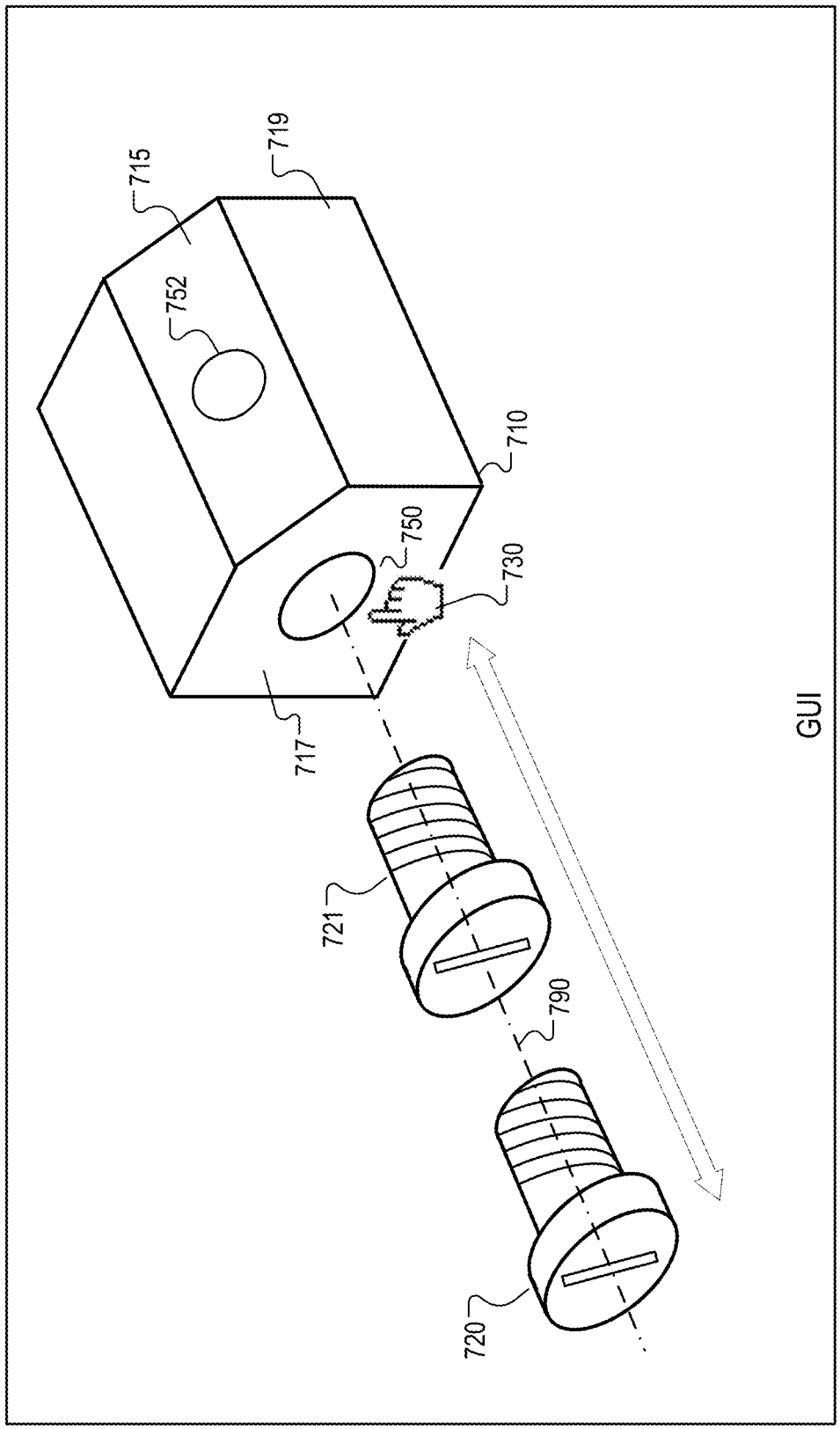
FIG. 7 is an exemplary illustration of the graphical user interface capable of enabling visualization of interrelation of three-dimensional objects based on planar projections in graphic applications, in accordance with some implementation of the present disclosure.

FIG. 7 is an exemplary illustration of the graphical user interface capable of enabling visualization of interrelation of three-dimensional objects based on planar projections in graphic applications, in accordance with some implementation of the present disclosure. When objects are displayed and drawn upon in a 2D projected space, it may be difficult to provide illustrative depictions of interrelation between various objects as the objects are moved relative to each other. FIG. 7 shows an improvement to the existing technology by enabling efficient visualization of such moving objects. A first object 710 displayed on the GUI screen may have multiple regions (which may be planar or non-planar), such as regions 715, 717, and 719, and various drawn-on objects, such as depictions of circular holes 750 and 752, in one illustrative example. A second object 720 may be displayed on the GUI screen concurrently with the first object 710. Shown as the second object 720 is a fastener (threaded bolt), but projective depictions of virtually any (two or more) objects may benefit from the described improvement. The user may want to visualize how the relative positions between the objects change when the interrelationship between objects is explored or modified.

As a non-limiting example, the second object 720 may correspond to a feature (e.g., a hole 750) in the first object 710. In operation (e.g., assembly of the first object 710 and the second object 720 into an integral whole), the second object 720 may be moved along the axis 790, which is the axis of the hole 750. In some implementations, the user may provide an input (730) and identify a feature in the first object to "lock" the second object into this feature. For example as the user selects the hole 750, the PM 214 may identify the region 717 that the hole (or any other feature) belongs to, and may further determine the 3D orientation of the identified region 717. In some implementations, the region 717 may be parallel to one of the base planes of the planar projection. In some implementations, the PM 214 may perform determination of this orientation as described above in relation to any of FIGS. 3A-B, 4A-D, 5A-E, and 6A-C respectively. In some implementations, the PM 214 may retrieve this orientation from the memory (if such determination has been previously performed before). The user selection 730 of the locking feature (e.g., hole 750) may be performed using any suitable input. For example, the user may point a mouse to the locking feature and press a certain "hot key" to initiate locking. A subsequent moving operation may be restricted to the axis of the locking feature (e.g., the axis 790). Accordingly, when the user attempts to move the second object 720, the second object is moved parallel to the axis 790, as depicted by a shifted position 721 of the second object 720. When the user needs to lift the locking restrictions, the user may press another "hot key" to stop locking and resume normal operations of the graphics application.

In some implementations, while the user is in the process of providing the input 730, a transient locking guide may be displayed to the user to help the user visualize (to facilitate correct positioning and sizing) the axis 790. Such a transient display may be modified in real time as the user makes changes to the input 730. When the user completes the selection process, the transient locking guide may disappear or merge into the end result (a final locking axis).

Figure 8:
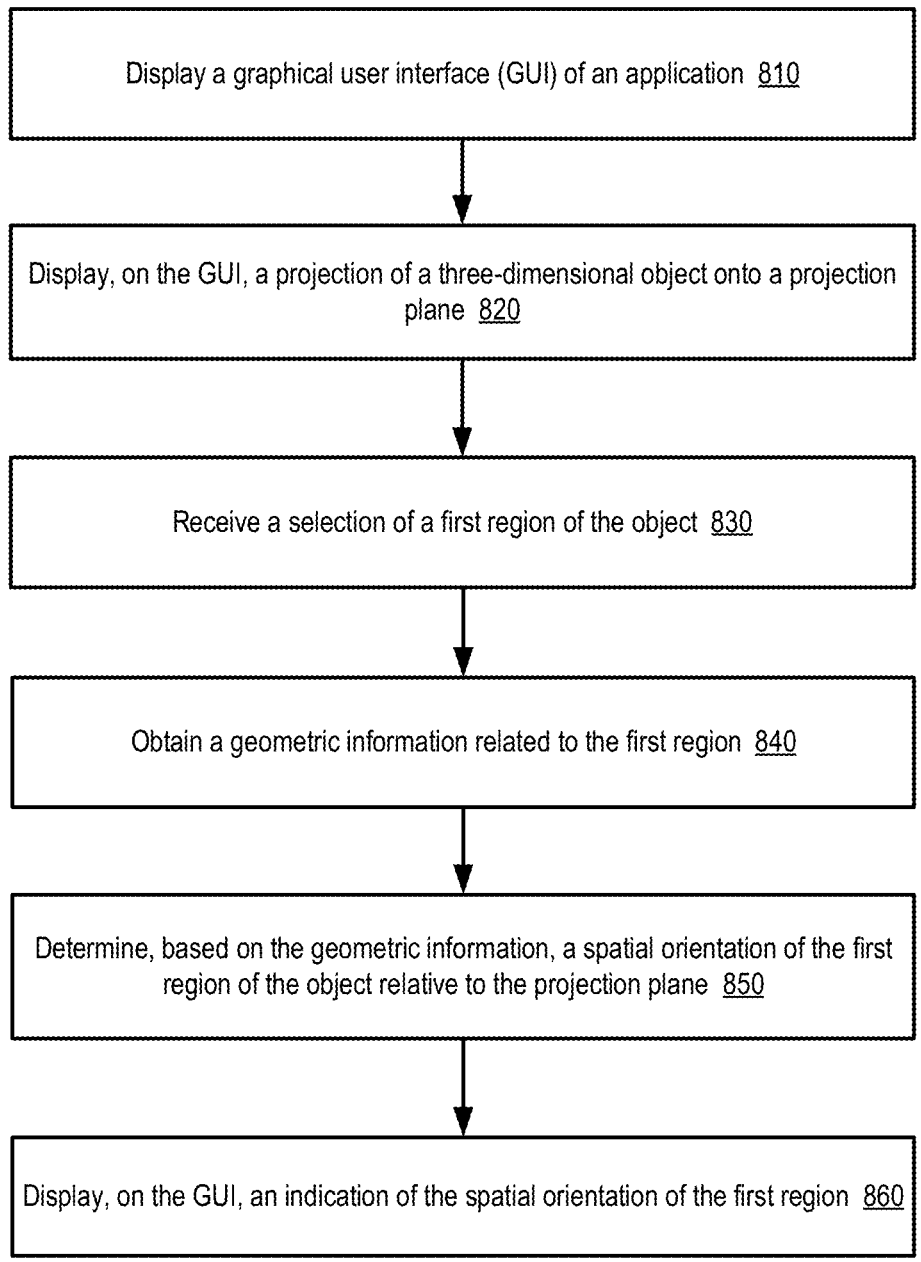
FIG. 8 depicts a flow diagram of one illustrative example of a method of efficient depictions of three-dimensional objects displayed in planar graphic user interfaces, in accordance with some implementations of the present disclosure.

FIG. 8 depicts a flow diagram of one illustrative example of a method 800 of efficient depictions of three-dimensional objects displayed in planar graphic user interfaces, in accordance with some implementations of the present disclosure. Method 800, as well as methods 900 and 1000 disclosed below, and/or each of their individual functions, routines, subroutines, or operations may be performed by one or more processing units of a processing device implementing the method, e.g., a computing system 202, or another device that is not explicitly shown in FIG. 2. In certain implementations, methods 800-1000 may be performed by a single processing thread. Alternatively, methods 800-1000 may be performed by two or more processing threads, each thread executing one or more individual functions, routines, subroutines, or operations of the method. In an illustrative example, the processing threads implementing methods 800-1000 may be synchronized (e.g., using semaphores, critical sections, and/or other thread synchronization mechanisms). Alternatively, the processing threads implementing methods 800-1000 may be executed asynchronously with respect to each other. Various operations of methods 800-1000 may be performed in a different order compared with the order shown in FIG. 8-10. Some operations of the methods may be performed concurrently with other operations. Some operations may be optional.

Method 800 may be directed to a computer system that supports a graphics application, such as the graphics application 210 of FIG. 2, in one implementation. Method 800 may be used to provide an enhanced functionality in displaying 3D objects using planar projections. At block 810, the processing device performing method 800 may display (e.g., to a user) a graphical user interface (GUI) of the graphics application. At block 820, method 800 may continue with displaying, on the GUI, a projection of a three-dimensional object onto a projection plane. The projection may be an isometric projection of the 3D object. The projection plane may coincide with the GUI screen displayed to the user. At block 830, the processing device may receive, from the user, a selection of a first region of the object. The selection may be performed by any pointing device, including but not limited to a mouse, a keyboard, a stylus, or a finger engaging a touchscreen. The first region may be a planar region not aligned with any of the base planes of the planar projection.

At block 840, method 800 may continue with obtaining a geometric information related to the first region. The geometric information may be obtained from the user. In some implementations, the geometric information may be partially or entirely retrieved from a memory device accessible to the graphics application. The geometric information may include any data sufficient to determine the spatial orientation of the selected first region. For example, the geometric information may include a geometric relationship of the first region to a second region of the object. More specifically, as illustrated in FIGS. 5A-C, the geometric relationship may be that of an orthogonality of the first region (515) to the second region (517). In some implementations, the user may indicate such orthogonality by, e.g., pointing to a boundary (a rib, an edge, etc.) between the two regions and providing an indication that the two regions are orthogonal, e.g., by selecting a predetermined "hot key" or a suitable menu button with the mouse). In some implementations, the geometric relationship may be stored in the memory and may be retrieved by the processing device without the need for a user input. In some implementations, the geometric information may include an identification of a shape belonging to the first region, such as the boundary of the first region. Alternatively, the identification may be of some shape located on (e.g., previously drawn) on the first region, whose geometric information is known or provided by the user.

The identification of the shape belonging to the first region may include identification of the shape as a one-parameter shape, such as a circle, a regular polygon, and so on. In some implementations, the one-parameter shape may be a pre-defined scalable shape. A scalable shape may be any geometric figure having a fixed relationship of its elements such that a single parameter (e.g., a length of any element of the shape) would be sufficient to determine the entire shape (but not necessarily its orientation in space, which may still be arbitrary). For example, a pre-defined shape may be a rhombus with an angle by its vertex equal to 30°. As another example, a pre-defined shape may be a triangle having sides that relate as 1:2:3, or in any other way. A pre-defined scalable shape may need only a single (scaling) parameter to determine all shape's dimensions.

At block 850, the processing device may determine, based on the geometric information, a spatial orientation of the first region of the object relative to the projection plane, as described in detail above, in relation to FIGS. 4A-D, 5A-E, and 6A-C respectively. In some implementations, determining the spatial orientation of the first region involves determining a set of 3D vectors corresponding to the first region (e.g., the two 3D vectors that define a shape belonging to the first region). At block 860, method 800 may continue with the processing device displaying, on the GUI, an indication of the spatial orientation of the first region. For example, displaying such indication may involve displaying a plurality of reference axes. One of the reference axis of the may be displayed as being perpendicular to the first region. Aligning the reference axes in this way may require rotating the reference axes from their default positions (e.g., default positions in the isometric projection, as illustrated by FIG. 1) until one of the axes is perpendicular to the first region. In some implementations, the specific axis (x, y, or z) that is to be aligned perpendicularly to the first region may the axis that requires the minimum rotation from its default position. Additionally, for the sake of convenience of presentation and subsequent manipulation, displaying the indication of the spatial orientation of the first region may include displaying a reference cube associated with the plurality of reference axes. Specifically, responsive to determining the spatial orientation of the first region, the reference cube may be rotated until one of its sides is parallel to the first region.

Figure 9:
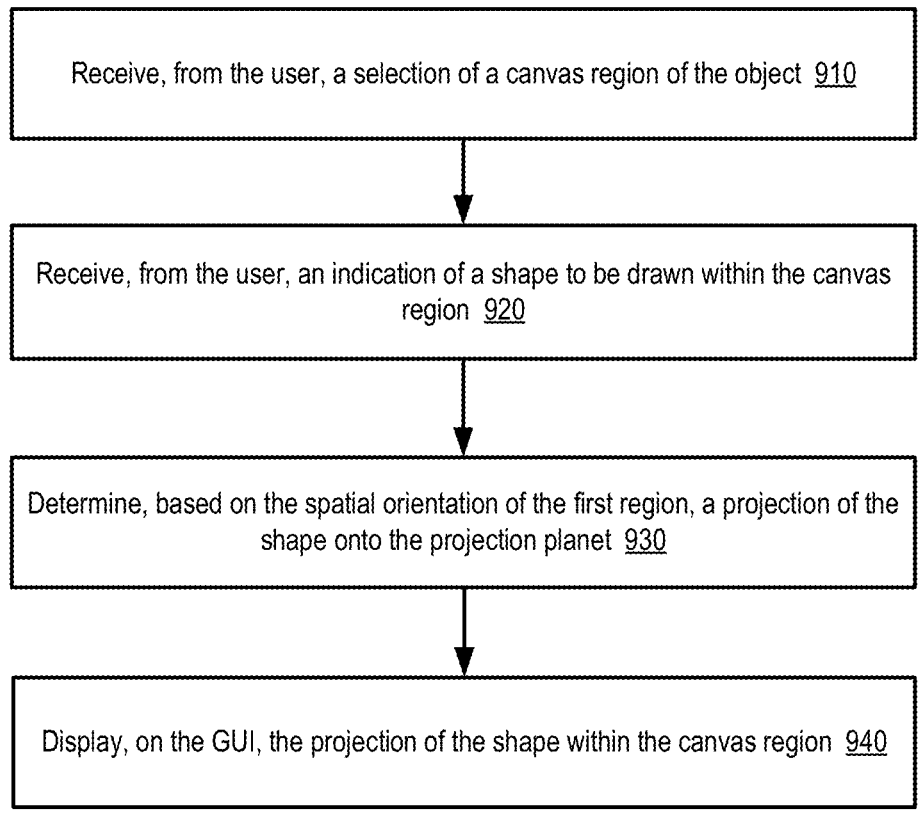
FIG. 9 depicts a flow diagram of one illustrative example of a method of drawing on or adding elements to three-dimensional objects displayed in planar graphic user interfaces, in accordance with some implementations of the present disclosure.

FIG. 9 depicts a flow diagram of one illustrative example of a method 900 of drawing on or adding elements to three-dimensional objects displayed in planar graphic user interfaces, in accordance with some implementations of the present disclosure. Method 900 may be directed to a computer system that supports a graphics application, such as the graphics application 210 of FIG. 2, in one implementation. Method 900 may be used to provide an enhanced functionality in manipulating 3D objects using planar projections. In some implementations, method 900 may be performed in combination with (or after) method 800. At block 910, the processing device performing method 900 may receive, from the user, a selection of a canvas region of the object. In some implementations, the canvas region may be the same as the first region. In some implementations, as illustrated in FIGS. 5D-E, the canvas region may be different from the first region. For example, after the reference cube is re-oriented responsive to the user's selection of the first region, the user may click on (or otherwise select) any of the three sides of the reference cube as the canvas surface.

At block 920, method 900 may continue with receiving, from the user, an indication of a shape to be drawn within the canvas region. The shape to be drawn may be one of standard shapes (circles, ellipses, polygons, and the like) or any custom shape, including any shape that may be drawn by the user "on the fly," after the canvas region is selected. In some implementations, a custom drawing window may be presented to the user. The user may draw a custom shape within the custom drawing window using any available drawing tools, as if the user were facing the canvas onto which the custom shape is to be added.

At block 930, the processing device performing method 900 may determine, based on the spatial orientation of the first region, a projection of the drawn shape onto the projection plane. Because the canvas region makes an angle with the projection plane (GUI screen), the projection of the shape onto the projection plane is, generally, different from the appearance of the same shape when viewed in a frontal view. Accordingly, determining the projection of the shape onto the projection plane may include obtaining a spatial relationship of the canvas region to the first region and a spatial relationship of the first region to the projection plane (e.g., as described above, in relation to FIGS. 4A-D, 5A-E, and 6A-C respectively). For example, in some instances, the canvas region may be perpendicular to the first region. Obtaining a spatial relationship of the canvas region to the first region may include receiving, from the user, an indication that the canvas region is perpendicular to the first region. At block 940, method 900 may continue with displaying, on the GUI, the projection of the shape within the canvas region.

Figure 10:
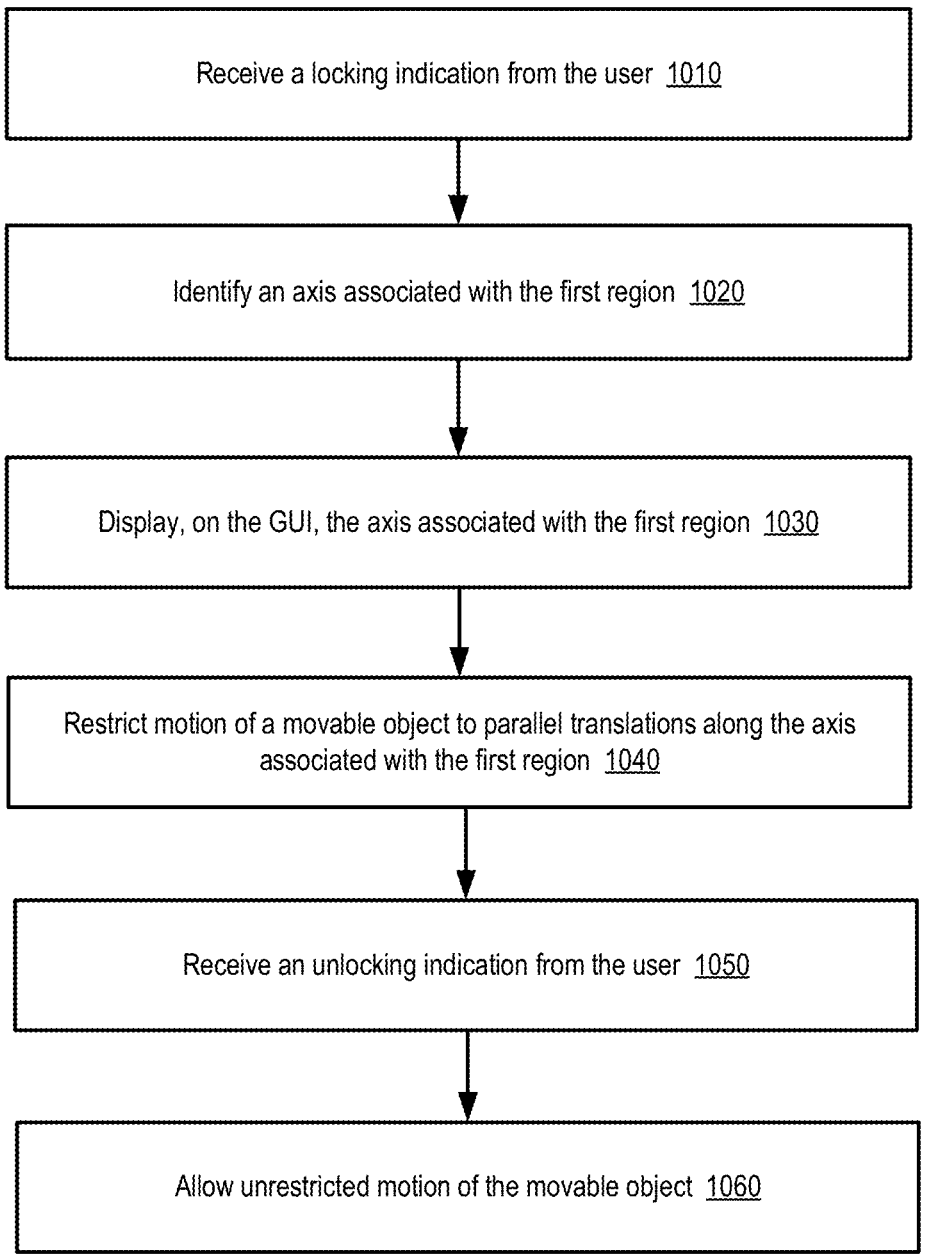
FIG. 10 depicts a flow diagram of one illustrative example of a method of enabling visualization of interrelation of three-dimensional objects, based on planar projections in graphic applications, in accordance with some implementation of the present disclosure.

FIG. 10 depicts a flow diagram of one illustrative example of a method 1000 of enabling visualization of interrelation of three-dimensional objects, based on planar projections in graphic applications, in accordance with some implementation of the present disclosure. Method 1000 may be directed to a computer system that supports a graphics application, such as the graphics application 210 of FIG. 2, in one implementation. Method 1000 may be used to provide an enhanced functionality in manipulating 3D objects using planar projections. In some implementations, method 1000 may be performed in combination with method 800. In some implementations, method 1000 may be performed independently from method 800. At block 1010, the processing device performing method 1000 may receive, from the user, a locking indication associated with the first region of the object displayed on the GUI. At block 1020, the processing device may receive, from the user, an identification of an axis associated with the first region. For example, the user may identify a shape associated with the first region, such as a depiction of a hole in the first region or a depiction of any part/element attached to the first region. The axis may be a symmetry axis of the part/element depicted by the identified shape.

At block 1030, method 1000 may continue with displaying, on the GUI, the axis associated with the first region. At block 1040, the processing device may restrict motion of a movable object to parallel translations along the axis associated with the first region. "Movable object" may be any part of the object already being displayed on the GUI (e.g., part of the object 310, 410, 510, 610, 710) or any new object added by the user after providing the locking indication. The movable object may have any functional (e.g., a fastener to be attached to the object 710) or visual (e.g., an element that is intended to be positioned in a certain way in relation to the object 710 without directly engaging the object 710). In some implementations, the processing device may restrict motion of all potentially movable objects. In some implementations, the processing device may restrict motion of only those movable objects that are specifically identified by the user.

After all desired moving and drawing operations are performed by the user, the user may provide an unlocking indication (e.g., by removing a lock flag from a mouse-clickable menu or by releasing a "hot key" held while performing moving operations, or by pressing an unlocking "hot key"). Accordingly, at block 1050, the processing device performing method 1000 may receive an unlocking indication from the user, and at block 1060, responsive to receiving such indication, allow unrestricted motion of the movable object(s).

Figure 11:
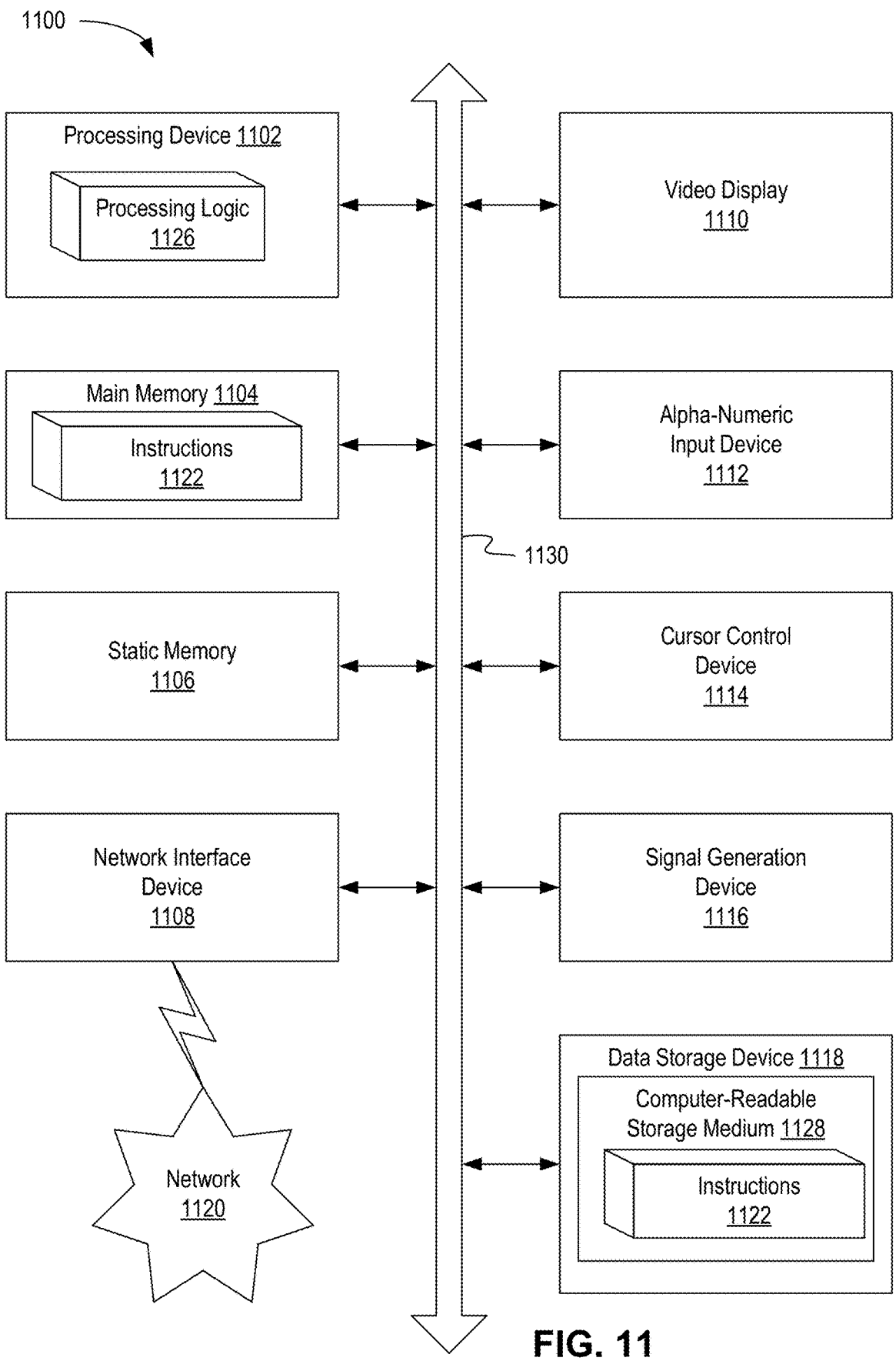
FIG. 11 depicts a block diagram of an example computer device capable of enabling viewing and operating on depictions of three-dimensional objects displayed in planar graphic user interfaces, operating in accordance with one or more aspects of the present disclosure.

FIG. 11 depicts a block diagram of an example computer device 1100 capable of enabling viewing and operating on depictions of three-dimensional objects displayed in planar graphic user interfaces, operating in accordance with one or more aspects of the present disclosure. In various illustrative examples, various components of the computer device 1100 may represent various components of the system hardware 204 illustrated in FIG. 2.

Example computer device 1100 may be connected to other computer devices in a LAN, an intranet, an extranet, and/or the Internet. Computer device 1100 may operate in the capacity of a server in a client-server network environment. Computer device 1100 may be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1100 may include a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1118), which may communicate with each other via a bus 1130.

Processing device 1102 represents one or more general-purpose processing devices such as a microprocessor, central processing unit, or the like. More particularly, processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1102 may be configured to execute instructions implementing method 800 of efficient depictions of three-dimensional objects displayed in planar graphic user interfaces, method 900 of drawing on or adding elements to three-dimensional objects displayed in planar graphic user interfaces, and method 1000 of enabling visualization of interrelation of three-dimensional objects, based on planar projections in graphic applications.

Example computer device 1100 may further comprise a network interface device 1108, which may be communicatively coupled to a network 1120. Example computer device 1100 may further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1116 (e.g., a speaker).

Data storage device 1118 may include a computer-readable storage medium (or, more specifically, a non-transitory computer-readable storage medium) 1128 on which is stored one or more sets of executable instructions 1122. In accordance with one or more aspects of the present disclosure, executable instructions 1122 may comprise executable instructions implementing method 800 of efficient depictions of three-dimensional objects displayed in planar graphic user interfaces, method 900 of drawing on or adding elements to three-dimensional objects displayed in planar graphic user interfaces, and method 1000 of enabling visualization of interrelation of three-dimensional objects, based on planar projections in graphic applications.

Executable instructions 1122 may also reside, completely or at least partially, within main memory 1104 and/or within processing device 1102 during execution thereof by example computer device 1100, main memory 1104 and processing device 1102 also constituting computer-readable storage media. Executable instructions 1122 may further be transmitted or received over a network via network interface device 1108.

While the computer-readable storage medium 1128 is shown in FIG. 11 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus.

Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a memory storing computer executable instructions for execution by a processor;
   a display; and
   the processor for executing the computer executable instructions; wherein
   the computer executable instructions configure the processor to:
      execute a graphical software application;
      render a graphical user interface (GUI) upon the display relating to the software application;
      render within the GUI a projection of a three-dimensional object (object) onto a projection plane;
      render within the GUI a projection of a three-dimensional reference object (reference object) onto the projection plane;
      receive a user input relating to selection of a region of the object;
      establish with the processor geometric information related to the user input; and
      render within the GUI an indication of the established geometric information; and
   the computer executable instructions further configure the processor to:
      define an axis perpendicular to the selected region of the object;
      render to a user another three-dimensional object (another object);
      enable the user to select and move the other object relative to the object within the GUI; and
      the other object is locked to moving along the axis.

2. The system according to claim 1, wherein
   establishing geometric information related to the user input comprises:
      automatically establishing with the processor geometric information related to the region of the object;
      automatically determining based upon the established geometric information a spatial orientation of the selected region of the object relative to the projection plane; and
      automatically rotating the reference object such that a predetermined plane of the reference object is aligned parallel to the selected region of the object; and
   rendering the indication of the established geometric information comprises re-rendering within the GUI a projection of the reference object in its rotated position onto the projection plane.

3. The system according to claim 1, wherein
   defining an axis perpendicular to the selected region of the object in established in dependence upon an orientation of the selected region of the objected established when establishing the geometric information.

4. The system according to claim 1, wherein
   the received user input relating to the selection of a region of the object is the selection of a feature of the object.

5. A system comprising:
   a memory storing computer executable instructions for execution by a processor;
   a display; and
   the processor for executing the computer executable instructions; wherein
   the computer executable instructions configure the processor to:
      execute a graphical software application;
      render a graphical user interface (GUI) upon the display relating to the software application;
      render within the GUI a projection of a three-dimensional object (object) onto a projection plane;
      render within the GUI a projection of a three-dimensional reference object (reference object) onto the projection plane;
      receive a user input relating to selection of a region of the object;
      establish with the processor geometric information related to the user input; and
      render within the GUI an indication of the established geometric information; and
   the computer executable instructions further configure the processor to:
      define an axis perpendicular to the selected region of the object in dependence upon an orientation of the selected region of the objected established when establishing the geometric information;
      render to a user another three-dimensional object (another object);
      enable the user to select and move the other object relative to the object within the GUI; and
      the other object is locked to moving along the axis.

6. The system according to claim 5, wherein
   the computer executable instructions configure the processor to establish the geometric information related to the user input based with a process comprising:
      determining whether a one-parameter geometric shape is present within the selected region of the object;
      upon determining a one-parameter geometric shape is presented within the selected region of the object perform the steps of:
         determining a pair of first vectors of the rendered one-parameter geometric shape relative to the GUI;
         determining a pair of second vectors in dependence upon the pair of first vectors; and
         determining the orientation of the selected region of the object in dependence upon a cross-product of the pair of second vectors.

7. The system according to claim 5, wherein
the computer executable instructions configure the processor to establish the geometric information related to the user input based with a process comprising:
  determine whether a two-parameter geometric shape is present within the selected region of the object;
  upon determining a two-parameter geometric shape is presented within the selected region of the object perform the steps of:
    determining a pair of first vectors of the rendered two-parameter geometric shape relative to the GUI;
    determining a pair of second vectors in dependence upon the pair of first vectors; and
    determining the orientation of the selected region of the object in dependence upon a cross-product of the pair of second vectors.

8. The system according to claim 5, wherein
the computer executable instructions configure the processor to establish the geometric information related to the user input based with a process comprising:
  determining a plane defined by a plurality of points associated with the selected region of the object;
  determining a pair of first vectors of the plane in dependence upon the plurality of points relative to the GUI;
  determining a pair of second vectors in dependence upon the pair of first vectors; and
  determining the orientation of the selected region of the object in dependence upon a cross-product of the pair of second vectors.

9. A system comprising:
a memory storing computer executable instructions for execution by a processor;
a display; and
the processor for executing the computer executable instructions; wherein
the computer executable instructions configure the processor to:
  execute a graphical software application;
  render a graphical user interface (GUI) upon the display relating to the software application;
  render within the GUI a projection of a three-dimensional object (object) onto a projection plane;
  render within the GUI a projection of a three-dimensional reference object (reference object) onto the projection plane;
  receive a user input relating to selection of a region of the object;
  establish with the processor geometric information related to the user input; and
  render within the GUI an indication of the established geometric information;
the received user input relating to the selection of a region of the object is the selection of a feature of the object; and
the computer executable instructions further configure the processor to:
  define an axis perpendicular to the selected region of the object in dependence upon an orientation of the selected region of the objected established when establishing the geometric information;
  render a transient locking guide wherein a guide axis of the transient locking guide is parallel to the axis perpendicular to the selected region of the object;
  receive additional inputs from the user to at least one of position and size the transient locking guide relative to the object wherein the guide axis of the transient locking guide is maintained parallel to the axis perpendicular to the selected region of the object during the at least one of the positioning and sizing of the transient locking guide;
  establish and render to a user another three-dimensional object (another object) in dependence upon additional inputs received from the user where the other object is generated by the graphical software application;
  receive other user inputs to align the other object to the transient locking guide and move the other object along the transient locking guide; and
  receive further user inputs to either:
    remove the transient locking guide;
  or:
    make the guide axis of the transient locking guide a final locking axis of the other object upon subsequent user actions with the GUI; and
when the guide axis of transient locking guide is made the final locking axis of the other object the other object can only be moved along the final locking axis.

10. The system according to claim 9, wherein
the computer executable instructions configure the processor to establish the geometric information related to the user input based with a process comprising:
  determining whether a one-parameter geometric shape is present within the selected region of the object;
  upon determining a one-parameter geometric shape is presented within the selected region of the object perform the steps of:
    determining a pair of first vectors of the rendered one-parameter geometric shape relative to the GUI;
    determining a pair of second vectors in dependence upon the pair of first vectors; and
    determining the orientation of the selected region of the object in dependence upon a cross-product of the pair of second vectors.

11. The system according to claim 9, wherein
the computer executable instructions configure the processor to establish the geometric information related to the user input based with a process comprising:
  determine whether a two-parameter geometric shape is present within the selected region of the object;
  upon determining a two-parameter geometric shape is presented within the selected region of the object perform the steps of:
    determining a pair of first vectors of the rendered two-parameter geometric shape relative to the GUI;
    determining a pair of second vectors in dependence upon the pair of first vectors; and
    determining the orientation of the selected region of the object in dependence upon a cross-product of the pair of second vectors.

12. The system according to claim 9, wherein
the computer executable instructions configure the processor to establish the geometric information related to the user input based with a process comprising:
  determining a plane defined by a plurality of points associated with the selected region of the object;
  determining a pair of first vectors of the plane in dependence upon the plurality of points relative to the GUI;
  determining a pair of second vectors in dependence upon the pair of first vectors; and determining the orientation of the selected region of the object in dependence upon a cross-product of the pair of second vectors.

\* \* \* \* \*